United States Patent
Wang

(10) Patent No.: US 10,037,687 B2
(45) Date of Patent: Jul. 31, 2018

(54) WEARABLE DEVICE AND DETECTING METHOD THEREOF

(71) Applicant: CM HK Limited, Fortress Hill (HK)

(72) Inventor: WeiChien Wang, Taipei (TW)

(73) Assignee: CM HK Limited, Fortress Hill (HK)

( * ) Notice: Subject to any disclaimer, the term of this patent is extended or adjusted under 35 U.S.C. 154(b) by 0 days.

(21) Appl. No.: 15/080,817

(22) Filed: Mar. 25, 2016

(65) Prior Publication Data

US 2016/0284210 A1 Sep. 29, 2016

(30) Foreign Application Priority Data

Mar. 25, 2015 (TW) .................................. 104109480

(51) Int. Cl.
*G08C 17/02* (2006.01)
*G06F 1/16* (2006.01)

(52) U.S. Cl.
CPC ............. *G08C 17/02* (2013.01); *G06F 1/163* (2013.01); *G08C 2201/32* (2013.01)

(58) Field of Classification Search
CPC ...... G08C 17/02; G08C 2201/32; G06F 1/163
USPC ........................................................ 340/12.5
See application file for complete search history.

(56) References Cited

U.S. PATENT DOCUMENTS

| 8,854,925 B1* | 10/2014 | Lee | ....................... G04G 9/0005 368/10 |
| 2006/0011729 A1 | 1/2006 | Sarela | |
| 2008/0216171 A1* | 9/2008 | Sano | .......................... H04L 9/32 726/19 |
| 2013/0072765 A1* | 3/2013 | Kahn | ........................ A61B 5/01 600/301 |
| 2014/0225730 A1* | 8/2014 | DePascale | .......... G08B 21/0269 340/539.13 |
| 2014/0278229 A1* | 9/2014 | Hong | .................... A61B 5/7455 702/160 |
| 2014/0378113 A1* | 12/2014 | Song | ........................ G06F 3/014 455/418 |
| 2015/0142141 A1* | 5/2015 | Okabayashi | ........... G08C 17/02 700/83 |
| 2015/0342527 A1* | 12/2015 | Karnik | ................. A61B 5/6843 600/408 |
| 2016/0026212 A1* | 1/2016 | Lee | ........................ G06F 1/3231 361/679.03 |

(Continued)

FOREIGN PATENT DOCUMENTS

| CN | 104146690 | 11/2014 |
| TW | 200517935 | 6/2005 |

(Continued)

*Primary Examiner* — Edwin Holloway, III
(74) *Attorney, Agent, or Firm* — JCIPRNET

(57) ABSTRACT

The wearable device includes a case, a processor, a storage unit, a sensor, and a power supply. The processor, the storage unit, the sensor, and the power supply are disposed in the case. The storage unit is electrically connected to the processor, and a default value is saved in the storage unit. The sensor is electrically connected to the processor. The sensor is configured to output a sensing value, and the sensing value is saved to the storage unit. The power supply is electrically connected to the processor, the storage unit, and the sensor. The processor is configured to execute a wearable mode or a non-wearable mode after the default value is compared with the sensing value.

11 Claims, 6 Drawing Sheets

(56) References Cited

U.S. PATENT DOCUMENTS

2016/0051191 A1\* 2/2016 Miller .................... A61B 5/681
                                                    600/300
2016/0249174 A1\* 8/2016 Patel .................... G01K 13/002

FOREIGN PATENT DOCUMENTS

TW          200847069       12/2008
TW          201508550        3/2015

\* cited by examiner

WEARABLE DEVICE AND DETECTING METHOD THEREOF

BACKGROUND OF THE INVENTION

Field of Invention

The present invention relates to a wearable device and detecting method thereof, more particularly relates to the wearable device and detecting method thereof which having the function of ensuring the wearable state.

Description of Related Art

All kinds of the wearable device have progressed day by day because of the technology development, so the demand of different function of the wearable device has also increased. For example, the wearable device has the function of detecting the physical function of the body by using the related hardware and application. However, the wearable device not correctly worn by user leads to an incorrect detecting result and a assessing error. Furthermore, when the user does not wear the wearable device, some consistently operated applications bring about the extra power consumption.

SUMMARY OF THE INVENTION

In order to solve the above-mentioned problem, one object of the present invention is to provide a wearable device and detecting method thereof which having the function of ensuring the wearable mode and saving the energy.

To achieve the foregoing and other object, a wearable device is provided. The wearable device includes a case, a processor, a storage unit, a sensor, and a power supply. The processor is disposed in the case. The storage unit is disposed in the case, and the storage unit is electrically connected with the processor, a default value is saved in the storage unit. The sensor is disposed in the case, and the sensor is electrically connected with the processor, the sensor is configured to output a sensing value, and the sensing value is saved in the storage unit. The power supply is disposed in the case, and the power supply is electrically connected with the processor, the storage unit, and the sensor. The processor executes a wearable mode or a non-wearable mode after the default value is compared with the sensing value.

In the above-mentioned wearable device, the wearable mode is configured to launch a first application, and the non-wearable mode is configured to launch a second application.

In the above-mentioned wearable device, a warning message is sent from the processor before the wearable mode or the non-wearable mode is executed.

In the above-mentioned wearable device, the sensor is a temperature sensor, the default value is 35° C.-37° C., the wearable mode is executed if the sensing value is equal to the default value; the non-wearable mode is executed if the sensing value is not equal to the default value.

In the above-mentioned wearable device, the sensor is the temperature sensor, the default value is the reference environment temperature, the non-wearable mode is executed if the sensing value is equal to the default value; the wearable mode is executed if the sensing value is not equal to the default value.

In the above-mentioned wearable device, the sensor is a pressure sensor, a capacitive sensor, a humidity sensor, an ultrasonic sensor, an infrared sensor or an illuminant sensor.

To achieve the foregoing and other object, a detecting method of the wearable device is provided. The detecting method of the wearable device includes the following steps. A wearable device is provided, and the wearable device includes a processor, a storage unit, a sensor, and a power supply. A default value is set in the storage unit. Then, the sensor is executed so as to output a sensing value, and the sensing value is saved in the storage unit. The processor executes a wearable mode or a non-wearable mode after the default value is compared and the sensing value.

In the above-mentioned detecting method, the wearable mode is configured to launch a first application, and the non-wearable mode is configured to launch a second application.

In the above-mentioned detecting method, a warning message is sent from the processor before the wearable mode or the non-wearable mode is executed.

In the above-mentioned detecting method, the sensor is the temperature sensor, the default value is 35° C.-37° C., the wearable mode executed if the sensing value is equal to the default value, and the non-wearable mode is executed if the sensing value is not equal to the default value.

In the above-mentioned detecting method, the sensor is the temperature sensor, the default value is the reference environment temperature, the non-wearable mode is executed if the sensing value is equal to the default value; the wearable mode is executed if the sensing value is not equal to the default value.

In the above-mentioned detecting method, the sensor is a pressure sensor, a capacitive sensor, a humidity sensor, an ultrasonic sensor, an infrared sensor, or an illuminant sensor.

To achieve the foregoing and other object, a wearable device is provided. The wearable device includes a case, a processor, a storage unit, a first sensor, a second sensor, and a power supply. The processor is disposed in the case. The storage unit is disposed in the case, and the storage unit is electrically connected with the processor. The first sensor is disposed on a first surface of the case, and the first sensor is electrically connected with the processor, the first sensor is configured to output a first sensing value, and the first sensing value is saved in the storage unit. The second sensor is disposed on a second surface of the case, and the second sensor is electrically connected with the processor, the second sensor is configured to output a second sensing value, and the second sensing value is saved in the storage unit. The power supply is disposed in the case, and the power supply is electrically connected with the processor, the storage unit, and the sensor. The processor executes a wearable mode or a non-wearable mode after the first sensing value is compared with the second sensing value.

In the above-mentioned wearable device, the wearable mode is configured to launch a first application and the non-wearable mode is configured to launch a second application.

In the above-mentioned wearable device, a warning message is sent from the processor before the wearable mode or the non-wearable mode is executed. The first sensor and the second sensor are both temperature sensors, the non-wearable mode is executed if the first sensing value is equal to the second sensing value; the wearable mode is executed if the first sensing value is not equal to the second sensing value.

In the above-mentioned detecting method, both the first sensor and the second sensor is a pressure sensor, a capacitive sensor, a humidity sensor, an ultrasonic sensor, an infrared sensor, or an illuminant sensor.

To achieve the foregoing and other object, a detecting method of the wearable device is provided. The detecting method of the wearable device includes the following steps. A wearable device is provided. The wearable device includes a processor, a storage unit, a first sensor, a second sensor, and a power supply. A first sensing value is outputted by executing the first sensor, and the first sensing value is saved in the storage unit. Then, a second sensing value is outputted by executing the second sensor, and the second sensing value is saved in the storage unit. The processor executes a wearable mode or a non-wearable mode after the first sensing value is compared with the second sensing value.

In the above-mentioned detecting method, the wearable mode is configured to launch a first application, and the non-wearable mode is configured to launch a second application.

In the above-mentioned detecting method, a warning message is sent from the processor before the wearable mode or the non-wearable mode is executing.

In the above-mentioned detecting method, the first sensor and the second sensor are both temperature sensors, the non-wearable mode is executed if the first sensing value is equal to the second sensing value; the wearable mode is executed if the first sensing value is not equal to the second sensing value.

In the above-mentioned detecting method, both the first sensor and the second sensor are pressure sensors, capacitive sensors, humidity sensors, ultrasonic sensors, infrared sensors, or illuminant sensors.

In summary, the sensing value outputted by one sensor is compared with the default value saved in the storage unit by the processor of the wearable device. On the other hand, the outputted sensing value of the sensor contacted with human body and that of the sensor exposed to the environment would be compared so as to execute a wearable mode or a non-wearable mode, and determine which application should be consistently operated. As a result, the extra power consumption can be avoided when the wearable device in not worn. The assessing error of the wearable device is sometimes occurred because of incorrect wearing method or position when the wearable device is used. In the situation, a wearing message is produced to remind the user from the wearable device before the wearable state or the non-wearable state is executed, so as to make the user can timely adjust the wearing method or position, so as to get the correct detecting outcome and effective assessing process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
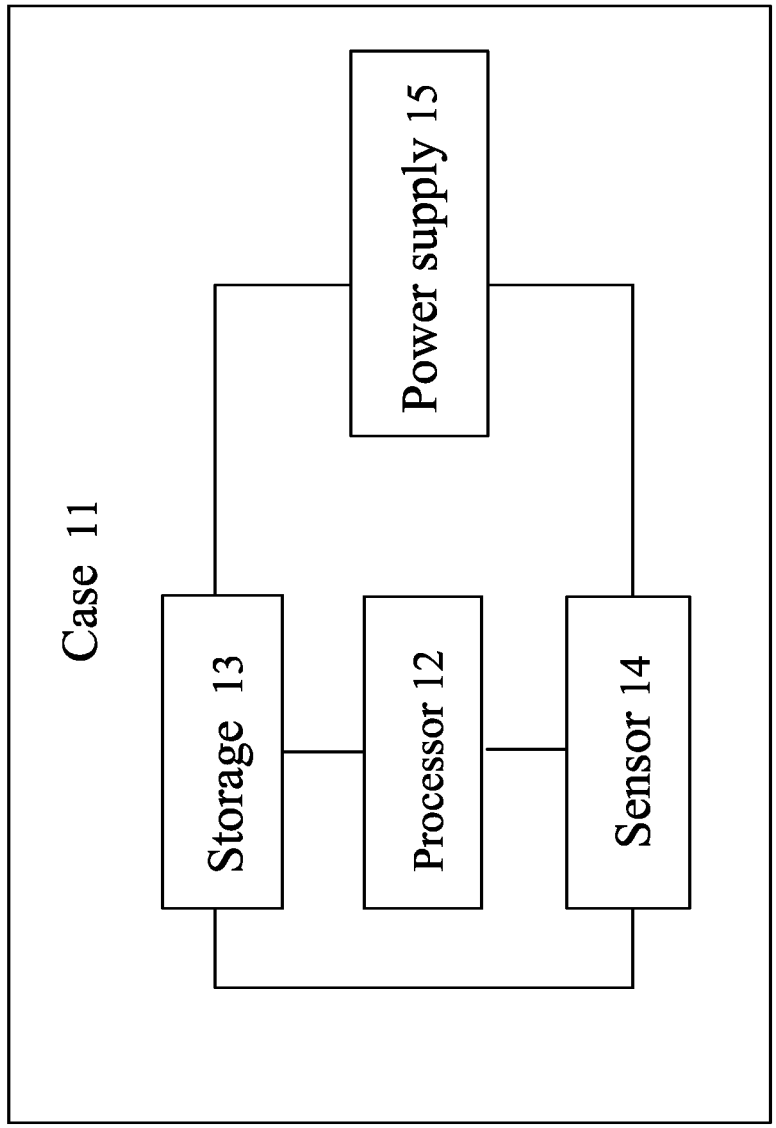
FIG. 1 illustrates a schematic diagram of a wearable device of a first embodiment of the present invention.
Figure 2:
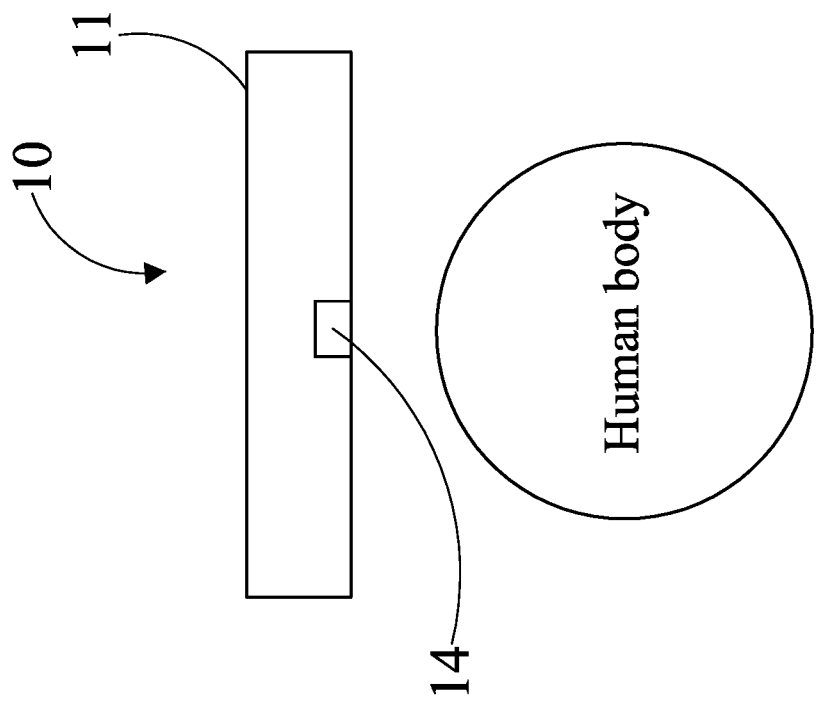
FIG. 2 illustrates a schematic diagram of the wearable device of FIG. 1 worn on the human body.

A device embodiment of the present invention is provided. Please refer to FIG. 1 and FIG. 2. FIG. 1 illustrates a schematic diagram of a wearable device of a first embodiment of the present invention. FIG. 2 illustrates a schematic diagram of the wearable device of FIG. 1 worn on the human body. The wearable device 10 of the present embodiment includes a case 11, a processor 12, a storage unit 13, a sensor 14, and a power supply 15. The processor 12, the storage unit 13, the sensor 14, and the power supply 15 are disposed in the case 11. The storage unit 13 is electrically connected to the processor 12, and a default value is saved in the storage unit 13. The sensor 14 is electrically connected to the processor 12, and the sensor 14 is configured to output a sensing value, and the sensing value is saved in the storage unit 13. The power supply 15 is electrically connected to the processor 12, the storage unit 13, and the sensor 14. In present embodiment, the processor 12 executes a wearable mode or a non-wearable mode after the default value is compared with the sensing value.

The wearable device 10 of the present embodiment is worn at the appropriate position of the human body such as wrist. In the present embodiment, the wearable device 10 is a smart wristband, a smart watch, a smart glass, or other wearable electronic devices. The sensor 14 is disposed on the surface of the case 11 faced to the human body. Thus, the physiological state of the human can be sensed and be outputted as the sensing value because of the sensor 14 touched or contacted with the human body. In the present embodiment, the sensor 14 is a temperature sensor. The sensing value and the default value are both temperature value. The range of the default value is between 35° C.-37° C. which is as same as the normal temperature of the human body. Furthermore, the sensor 14 can detect the radiation heat of the human body. Therefore, when the sensing value outputted by the sensor 14 is between 35° C.-37° C., the sensing value of the sensor 14 is outputted and saved in the storage unit 13 by the processor 12, and the sensing value is compared with the default value saved in the storage unit 13 by the processor 12. If the sensing value is equal to the default value, it means the wearable device 10 is worn and the processor 12 would execute the wearable mode. On the contrary, if the sensing value is not equal to the default value, it means the wearable device 10 is not worn and the processor 12 would execute the non-wearable mode.

Furthermore, the default value can be set as reference environment temperature. For example, when a user stays at the indoor, the wearable device 10 can obtain the reference environment temperature via wireless internet or other method, and by this the processor 12 set the indoor temperature such as 25° C.-30° C. If the user stays at the outside, the processor 12 can set the outdoor temperature such as 28° C.-35° C. Then, the sensing value of the sensor 14 is outputted and saved in the storage unit 13 by the processor 12. The sensing value would be compared with the default value saved in the storage unit 13 by the processor 12. If the sensing value is equal to the default value, it means the wearable device 10 is worn, so the processor 12 would execute the wearable mode. On the contrary, if the sensing value is not equal to the default value, it means the wearable device 10 is not worn, so the processor 12 would execute the non-wearable mode.

In other embodiments, when the user stays in the high temperature place, the reference environment temperature can be set as higher than the temperature of the human body such as above 38° C. If the sensing value is lower than the default value, it means the wearable device 10 is worn and the wearable mode is executed.

Therefore, the wearable mode of the present embodiment is configured to launch a first application which is configured to trigger at least a related application such as a physiological monitoring application). For example, the wearable device 10 is the smart glasses, the first application is connected to a virtual reality application, an augmented application, or other related applications. The non-wearable mode is configured to launch a second application. The second application is connected to a screen saver application, a power supply management application, or other related applications.

When the default value and the sensing value are comparing, the processor 12 still consistently receives the power from the power supply 15. When the processor 12 executes the non-wearable mode, some unnecessary operations of the hardware would be closed by the second application, For example, the screen is closed directly, or the power management application is triggered by the second application, so as to make the power supply 15 execute the power saving process. As a result, the wearable device 10 of the present embodiment can avoid the wasting of the power when the wearable device 10 is not worn.

Moreover, the first application is configured to launch a certain application program, and the second application is configured to stop the same application programs or different application programs. For a pedometer application program, when the wearable mode is executed, the first application triggers a pedometer application program to calculate the step counts of the user. When the non-wearable mode is executed, the second application stops the pedometer application program to calculate the step counts of the user. In addition, the second application can also connect to other application programs.

When the user uses the wearable device 10, the mistake in assessing the wearable device 10 is caused because of incorrect wearing method or position. Therefore, the related warning message is produced to remind the user of the wearable device 10 before the wearable mode or the non-wearable mode is executed, so as to make the user can timely adjust the wearing method or position. Thus, the correct detecting outcome and effective assessing operation is obtained. Beside, the user can also be reminded that the wearable mode of the wearable device 10 is executed. The above wearing message is such as an audio message, a light message, a text message, a vibration message, or other reminding message.

In other embodiment, the sensor 14 is a pressure sensor, and the default value is 101325 pascals (i.e. one atmospheric pressure). Therefore, when the sensing value outputted by the sensor 14 is 101325 pascals (atmospheric pressure), the non-wearable mode is executed by the processor 12 when the sensing value is equal to the default value. In more detail, when the wearable device 10 is not worn, the atmospheric pressure is sensed by the sensor 14, so the sensing value sensed by the sensor 14 is equal to the atmospheric pressure (the default values). Thus, the processor 12 determines the wearable device 10 is not worn via comparing the default value with the sensing value.

On the contrary, when the sensing value is not equal to the default value, the processor 12 determines the wearable device 10 is worn. In more detail, when the wearable device is worn, the sensor 14 would sense the sum of the atmospheric pressure and the pressure pressed on the wearable device 10 by the human body. Thus, the sensing value sensed by the sensor 14 is larger than the atmospheric pressure (the default values), and the processor 12 determines the wearable device 10 is worn because the sensing value and the default value are not equal.

Figure 3:
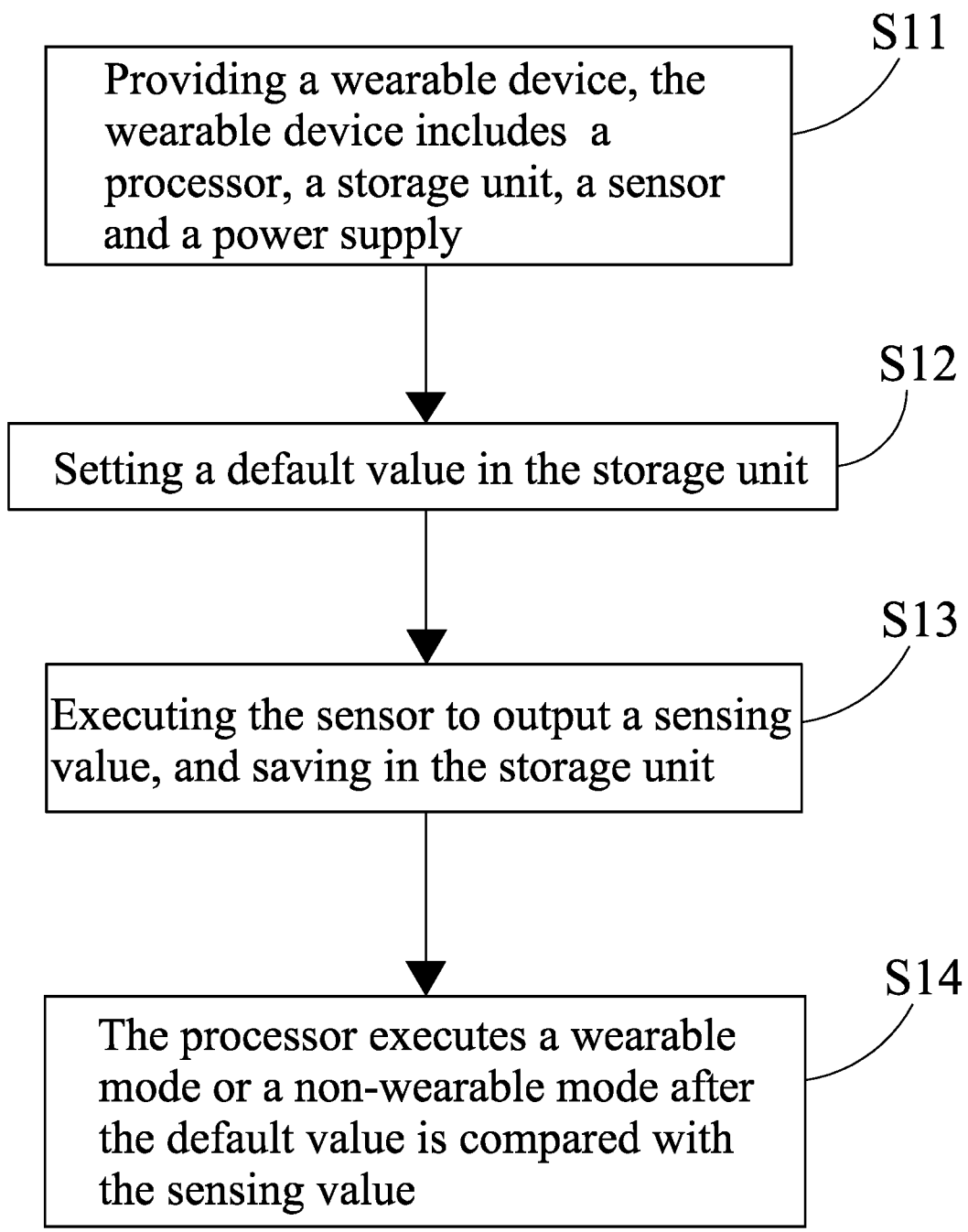
FIG. 3 illustrates a process diagram of a detecting method of a wearable device shown in FIG. 1.

An embodiment of a method is provided. FIG. 3 illustrates a process diagram of a detecting method of a wearable device shown in FIG. 1. A detecting method of the wearable device includes the following steps. First, at the step S11, a wearable device is provided, the wearable device includes a processor, a storage unit, a sensor, and a power supply. Then, at the step S12, a default value is saved in the storage unit. Next, at the step S13, a sensor is executed and outputs a sensing value, and the sensing value is saved in the storage unit.

Then, at the step S14, a wearable mode or a non-wearable mode is executed after default value is compared with the sensing value by the processor. A wearing message is produced to remind the user before the non-wearable mode is executed. The mistake in the estimation of the wearable device is caused because of incorrect wearing method or position, so as to make the user can timely adjust the wearing method or position. Thus, the correct detecting outcome and effective estimating process of the wearable devices can be obtained In summary, the sensor of the first embodiment is the temperature sensor. When the case contacts with the human body, the temperature of case would be closed to the temperature of human body because of the radiant heat of human body. Thus, whether the wearable device 10 is worn on the human body or not is determined via the detecting method of a wearable device of the present invention. Therefore, the incorrect detecting result due to the wrong wearing can be solved. It also make user to correctly wear the wearable device 10 and achieve energy saving effect.

Figure 4:
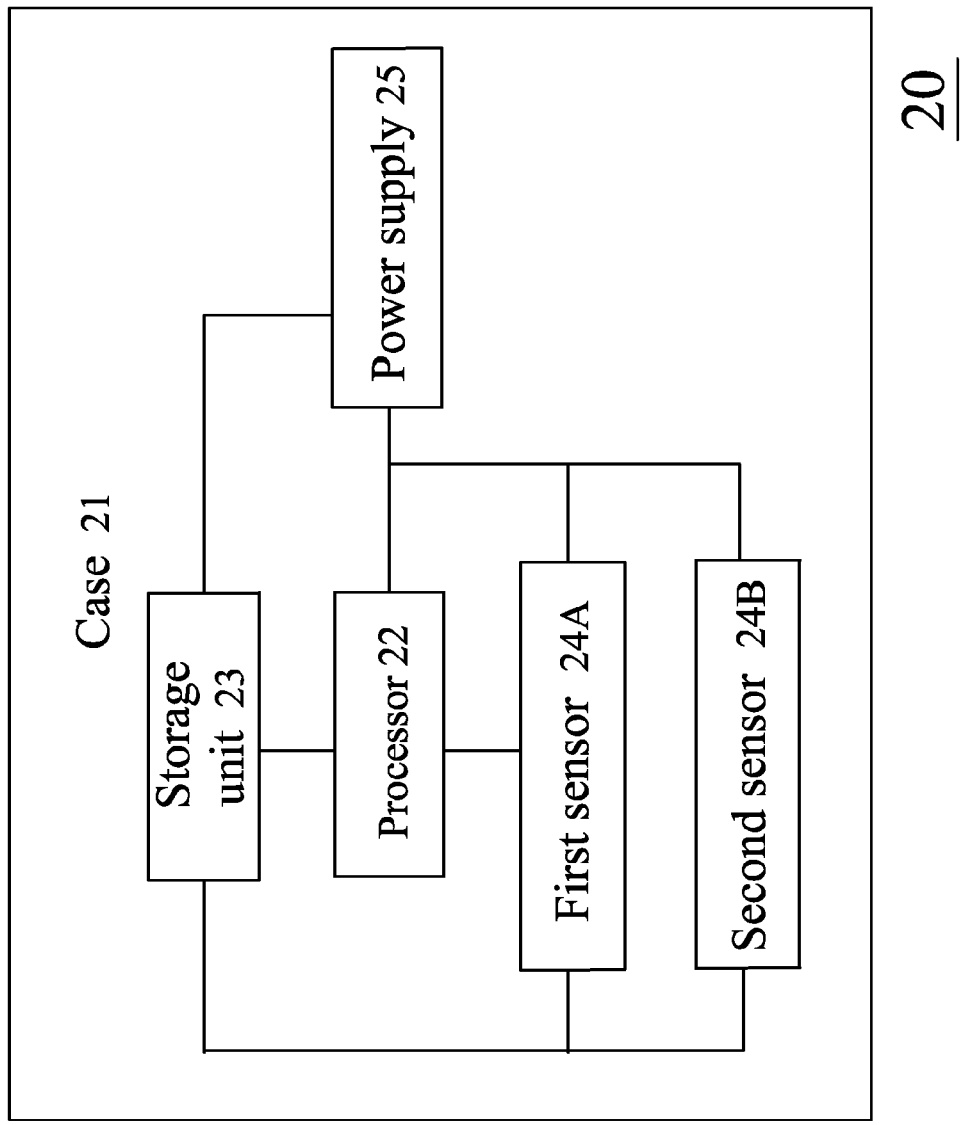
FIG. 4 illustrates a schematic diagram of a wearable device of a second embodiment of the present invention.
Figure 5:
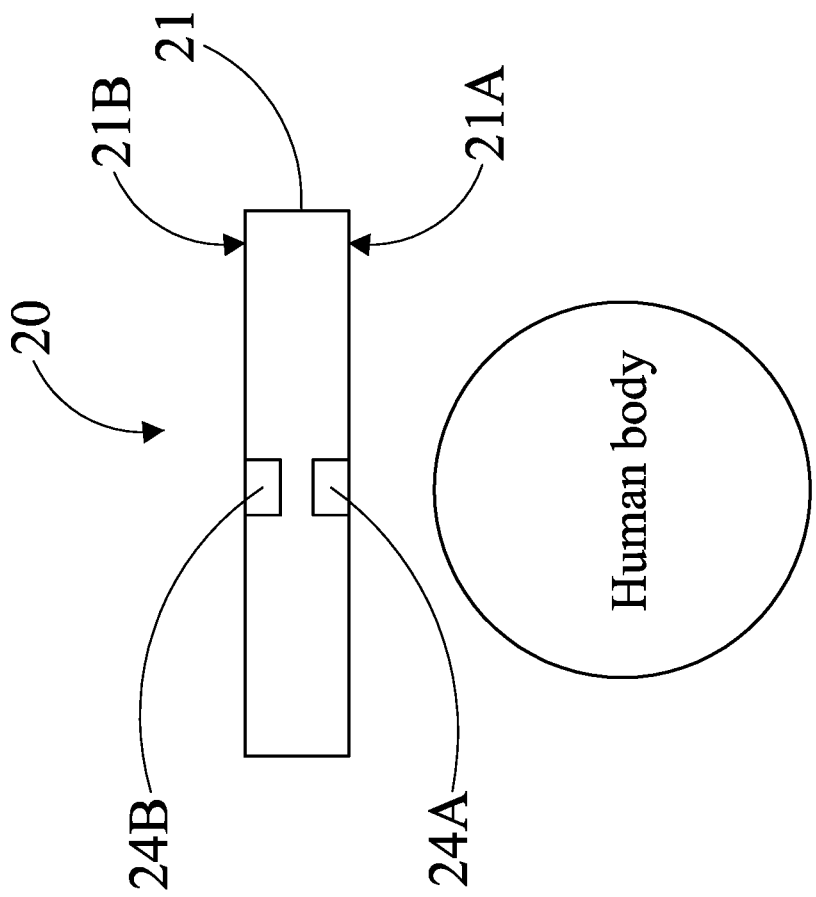
FIG. 5 illustrates a schematic diagram of a wearable device of FIG. 4 worn on the human body.

Another embodiment of the device is provided. FIG. 4 illustrates a schematic diagram of a wearable device of a second embodiment of the present invention. FIG. 5 illustrates a schematic diagram of a wearable device of FIG. 4 worn on the human body. A wearable device 20 includes a case 21, a processor 22, a storage unit 23, a first sensor 24A, a second sensor 24B, and a power supply 25. The processor 22, the storage unit 23, the first sensor 24A, the second sensor 24B, and the power supply 25 are disposed in the case 21. The first sensor 24A is disposed in a first surface 21A of the case 21, and the second sensor 24B is disposed in a second surface 21B of the case 21.

The storage unit 23 is electrically connected to the processor 22. The first sensor 24A and the second sensor 24B are electrically connected to the processor 22. The first sensor 24A is configured to output a first sensing value, and the first sensing value is saved in the storage unit 23. In similarly, the second sensor 24B is configured to output a second sensing value, and the second sensing value is saved in the storage unit 23. The power supply 25 is electrically connected to the processor 22, the storage unit 23, the first sensor 24A, and the second sensor 24B. In more particularly, in the second embodiment, the processor 22 executes a wearable mode or a non-wearable mode after the first sensing value is compared with the second sensing value.

The wearable device 10 of the first embodiment is similar to the wearable device 20 of the second embodiment. The following are main difference of each other: the wearable device 20 of the second embodiment has the first sensor 24A and the second sensor 24B, and the first sensor 24A and the second sensor 24B are configured to output the first sensing value and the second sensing value. The first sensing value and the second sensing value are saved in the storage unit 23. In more detail, the first sensor 24A is disposed in the face of case 21 faced the human body (21A), so as to sense the physiological state and output a sensing value via touching human body. On the other hand, the second sensor 24B is disposed in the face (21B) of case 21 which is not touched with the human body, so as to sense the environment and output the second sensing value.

It is the same as or similar to the wearable device 10 of the first embodiment, in the wearable device 20 of the second embodiment, the first sensor 24A and the second sensor 24B are both temperature sensors, and the first sensing value and the second sensing value are temperature value. Therefore, when the user wears the wearable device 20, the first sensing value outputted by the first sensor 24A is the human body temperature, the second sensing value outputted by the second sensor 24B is the reference ambient temperature. As a result, after the processor 22 compares the first sensing value with the second sensing value, the processor 22 would determine whether the wearable device 20 is worn or not. If the first sensing value is not equal to the second sensing value, it is mean the wearable device 20 is worn. Thus, the processor 22 would execute the wearable mode and the first application.

On the contrary, when the user not wears the wearable device 20, the first sensing value outputted by the first sensor 24A and the second sensing value outputted by the second sensor 24B are the reference ambient temperature. As a result, the processor 22 compares the first sensing value with the second sensing value. If the first sensing value is equal to the second sensing value, it means the wearable device 20 is not worn. Thus, the processor 22 would execute the non-wearable mode and the second application.

In similarly, the wearable mode of the present embodiment is configured to launch a first application, and the first application is configured to connect to trigger related application such as physiological monitoring program. If the wearable device 20 is a smart glasses, the first application is configured to trigger a virtual reality application and an augmented reality application, or other related applications. The non-wearable mode is configured to launch the second application, and the second application is configured to close some hardware operation or application such as closing the screen, or the application connected or related with the second application (e.g. screen saver application, power supply management application, or other related applications) can be triggered.

If the wearable mode is executed after the processor 22 compares the first sensing value with the second sensing value, the first application is launched. On the contrary, a second application is launched if the non-wearable mode is executed by the processor 22. As a result, when the wearable device 20 of the second embodiment executes the non-wearable mode, the second application would launch the power supply management application, so as to make the power supply 25 execute the process of saving. Thus, the wearable device 20 of the present embodiment can avoid the extra power consumption when the wearable device 20 is not worn.

It is the same as or similar to the wearable device 10, when the user uses the wearable device 20 of the second embodiment, the mistake in assessing the wearable device is caused because of incorrect wearing method or position. Therefore, the wearing message is produced to remind the user from the wearable device 20 before the wearable mode or the non-wearable mode is executed, so as to make the user can timely adjust the wearing method or position. Therefore, the correct detecting outcome and effective assessing operation of the wearable devices are obtained, and reminding the user that the wearable device 20 is executing power-saving mode. The wearing message is such as an audio message, a light message, a text message, a vibration message, or other reminding message.

In the wearable device 20 of the present embodiment, the first sensor 24A and the second sensor 24B also can be a pressure sensor. Therefore, when the user wears the wearable device 20 of the present embodiment, the first sensing value outputted by the first sensor 24A is a sum of the atmospheric pressure and the pressure pressed on the wearable device 20 by the human body. Therefore, the first sensing value sensed by the first sensor 24A is larger than the second sensing value sensed by the second sensor 24B (the atmospheric pressure value). It means according to the comparing result of the first sensing value not equaling to the second value the wearable device 20 is determined as being worn by the user.

When the user does not wear the wearable device 20 of the present embodiment, the first sensing value sensed by the first sensor 24A and the second sensing value sensed by the second sensor 24B are the atmospheric pressure value, so the first sensing value sensed by the first sensor 24A is equal to the second sensing value sensed by the second sensor 24B (both are the atmospheric pressure value). It means according to the comparing result of the first sensing value equaling to the second value the wearable device 20 is determined as not being worn by the user.

Figure 6:
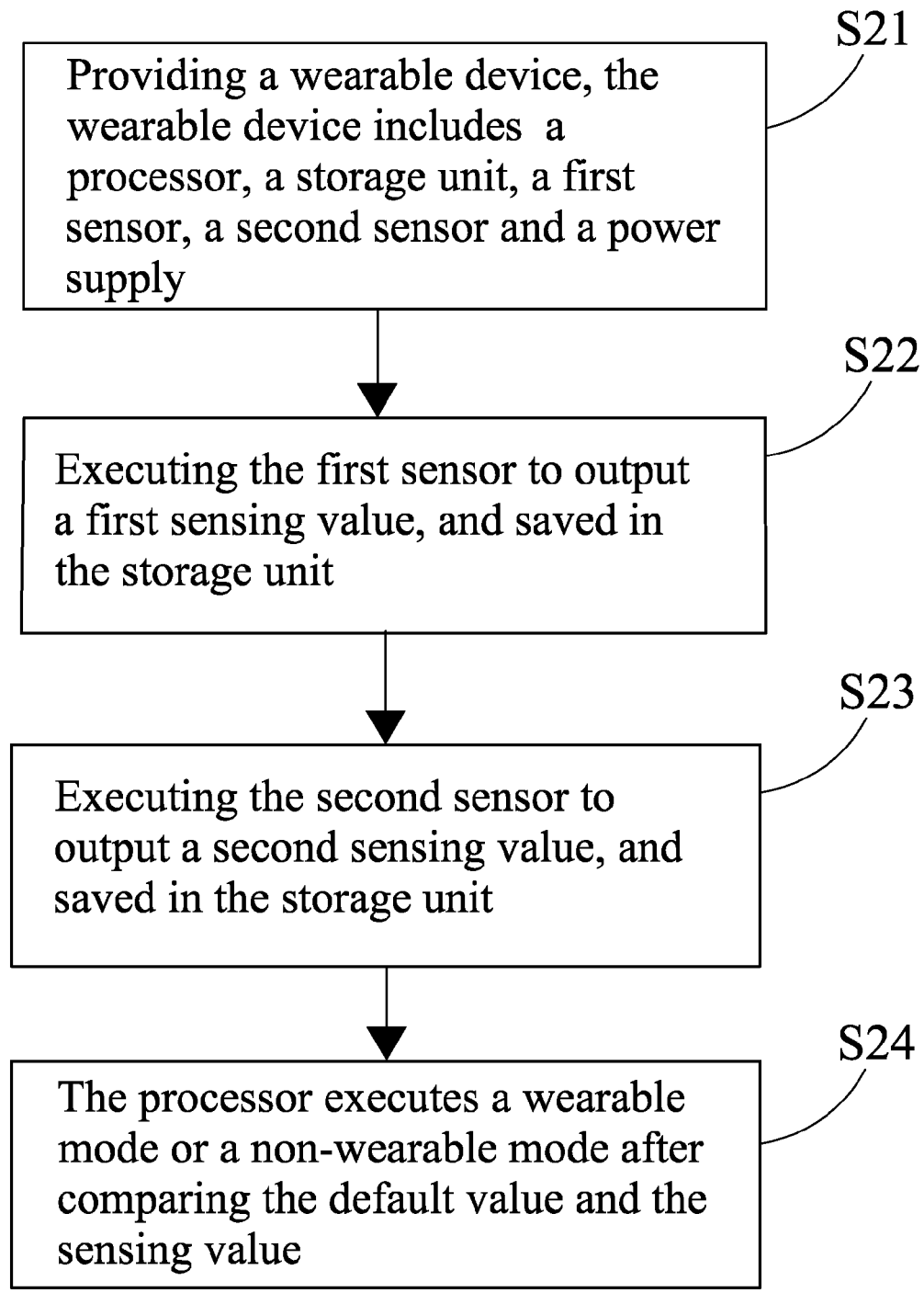
FIG. 6 illustrates a process diagram of a detecting method of a wearable device shown in FIG. 4.

FIG. 6 illustrates a process diagram of a detecting method of a wearable device shown in FIG. 4. A detecting method of the wearable device is provided, and the detecting method of the wearable device includes the following steps. First, at the step S21, a wearable device is provided, and the wearable device includes a processor, a storage unit, a first sensor, a second sensor, and a power supply. Then, at the step S22, the first sensor is executed to output a first sensing value, and the first sensing value is saved in the storage unit. Next, at the step S23, the second sensor is executed to output a second sensing value, and the second sensing value is saved in the storage unit. Then, at the step S24, the processor compares the first sensing value with the second sensing value, and executes the wearable mode or non-wearable mode. In other words, a warning message is produced to remind the user before the non-wearable mode is executed. When the mistake in assessing the wearable device is caused because of incorrect wearing method or position, the warning message can make the user immediately adjust the wearing method or position. Then, the correct detecting outcome and effective estimating process of the wearable devices can be obtained.

In summary, in the second embodiment, the sensor is the temperature sensor. The first sensing value outputted by the first sensing sensor is equal to the human body temperature, and the second sensing value outputted by the second sensing sensor is equal to the the reference environment temperature. Therefore, compared with the wearable device of the first embodiment, the wearable device of the second embodiment can more precisely determine whether the wearable device is worn or not. As a result, the present invention can solve the problem or mistake produced by the incorrect wearing method or position. It also make user to correctly wear the wearable device 10 and achieve energy saving effect.

The sensor of the present invention can be a capacitive sensor, a humidity sensor, an ultrasonic sensor, an infrared sensor, or an illuminant sensor based on the designer's or manufacturer's choice. The capacitive sensor is used by sensing the capacitance value difference. The humidity sensor senses the humidity from the human body. The ultrasonic sensor senses the distance by receiving the echo from the nearest object. The infrared sensor is used by sensing the electromagnetic wave. The illuminant sensor is used by sensing the illumination.

In summary, in the first embodiment the sensing value outputted by one sensor is compared with the default value saved in the storage unit by the processor of the wearable device. In the second embodiment, the outputted sensing value of the sensor touched with human body and that of the sensor exposed to the environment would be compared so as to execute a wearable mode or a non-wearable mode. Furthermore, it can trigger the first application or second application. As a result, the extra power consumption can be avoided when the wearable device in not worn.

The mistake in the assessing the wearable device is caused because of incorrect wearing method or position. For example, the detecting method of the wearable device of the present invention is used to detect the physiological characteristics of the user, so as to help the users to understand their physiological state. For example, a sleep detecting application installed in a traditional wearable device which has an accelerometer for assessing the sleeping quality of the user. However, for the traditional wearable device, if the wearable device is not worn by the human body and the accelerometer is in the stationary state, the wearable device would wrongly recognize the user is sleeping. In the contrary, the wearable device of the present invention can assess whether the wearable device is worn correctly. Moreover, the warning message is produced to remind the user before the wearable mode and the non-wearable mode are executed by the wearable device, so as to make the user timely adjust the wearing method or position, and obtain the correct detecting outcome and effective assessing operation.

Although the description above contains many specifics, these are merely provided to illustrate the invention and should not be construed as limitations of the invention's scope. Thus it will be apparent to those skilled, in the art that various modifications and variations can be made in the system and processes of the present invention without departing from the spirit or scope of the invention.

What is claimed is:

1. A wearable device comprising:
a case;
a processor disposed in the case;
a storage unit disposed in the case and electrically connected to the processor, the storage unit further having a default value, wherein the default value is equal to an atmospheric pressure; and
a pressure sensor disposed in the case and electrically connected to the processor, the pressure sensor configuring to output a sensing value, and the sensing value saved in the storage unit;
wherein the processor executes a wearable mode to launch a first application to calculate a step count of a user when the sensing value is not equal to the default value;
wherein the processor executes a non-wearable mode to launch a second application to stop calculating the step count of the user when the sensing value is equal to the default value.

2. The wearable device of the claim 1, wherein a warning message is produced from the processor before the wearable mode or the non-wearable mode is executed.

3. The wearable device of the claim 2 further comprising:
a power supply disposed in the case and electrically connected to the processor, the storage unit, and the pressure sensor.

4. A detecting method of a wearable device having a processor, a storage unit, and a pressure sensor, the detecting method comprising:
setting a default value in the storage unit, wherein the default value is equal to an atmospheric pressure;
outputting a sensing value by the pressure sensor;
comparing the default value with the sensing value by the processor;
executing a wearable mode to launch a first application to calculate a step count of a user by the processor when the sensing value is not equal to the default value; and
executing a non-wearable mode to launch a second application to stop calculating the step count of the user by the processor when the sensing value is equal to the default value.

5. The detecting method of the wearable device of the claim 4, wherein a warning message is produced from the processor before the wearable mode or the non-wearable mode is executed.

6. A wearable device comprising:
a case;
a processor disposed in the case;
a storage unit disposed in the case and electrically connected to the processor;
a first pressure sensor disposed on a first surface of the case, and the first pressure sensor electrically connected to the processor, the first pressure sensor configured to output a first sensing value, and the first sensing value saved in the storage unit, wherein the first sensing value is a sum of an atmospheric pressure value corresponding to an atmospheric pressure and a pressed value corresponding to a pressure pressed on the wearable device by a human body; and
a second pressure sensor disposed on a second surface of the case, and the second pressure sensor electrically connected to the processor; the second pressure sensor configured to output a second sensing value, and the second sensing value saved in the storage unit, wherein the second sensing value is the atmospheric pressure value corresponding to the atmospheric pressure;
wherein the processor executes a wearable mode to launch a first application to calculate a step count of a user when the first sensing value is greater than the second sensing value;
wherein the processor executes a non-wearable mode to launch a second application to stop calculating the step count of a user when the first sensing value is equal to the second sensing value.

7. The wearable device of the claim 6, wherein a warning message is sent from the processor before the wearable mode or the non-wearable mode executed.

8. The wearable device of the claim 6, further comprising:
a power supply disposed in the case and electrically connected to the processor, the storage unit, the first pressure sensor and the second pressure sensor.

9. A detecting method of a wearable device having a first pressure sensor, a second pressure sensor, a processor, and a storage unit, the detecting method comprising:
outputting a first sensing value by the first pressure sensor, wherein the first sensing value is a sum of an atmospheric pressure value corresponding to an atmospheric pressure and a pressed value corresponding to a pressure pressed on the wearable device by a human body;

outputting a second sensing value by the second pressure sensor, wherein the second sensing value is the atmospheric pressure value corresponding to the atmospheric pressure; and executing a wearable mode to launch a first application to calculate a step count of a user by the processor when the first sensing value is greater than the second sensing value; and executing a non-wearable mode to launch a second application to stop calculating the step count of the user by the processor when the first sensing value is equal to the second sensing value.

10. The detecting method of the claim 9, wherein a warning message is sent from the processor before the wearable mode or the non-wearable mode is executed.

11. The detecting method of the claim 9, wherein a warning message is sent in response to an incorrect wearing method or position of the wearable device so as to remind the user of the wearable device to adjust the wearing method or position.

* * * * *